US008279341B1

(12) United States Patent
Bozinovic

(10) Patent No.: US 8,279,341 B1
(45) Date of Patent: Oct. 2, 2012

(54) ENHANCING THE RESOLUTION AND QUALITY OF SEQUENTIAL DIGITAL IMAGES

(75) Inventor: Nikola Bozinovic, San Francisco, CA (US)

(73) Assignee: MotionDSP, Inc., Burlingame, CA (US)

( * ) Notice: Subject to any disclaimer, the term of this patent is extended or adjusted under 35 U.S.C. 154(b) by 1285 days.

(21) Appl. No.: 11/678,998

(22) Filed: Feb. 26, 2007

(51) Int. Cl.
*H04N 11/20* (2006.01)
*G06K 9/32* (2006.01)

(52) U.S. Cl. ........................................ 348/452; 382/299
(58) Field of Classification Search .................. None
See application file for complete search history.

(56) References Cited

U.S. PATENT DOCUMENTS

| 5,579,054 | A | * | 11/1996 | Sezan et al. | 348/452 |
|---|---|---|---|---|---|
| 5,706,417 | A | * | 1/1998 | Adelson | 345/640 |
| 6,188,780 | B1 | | 2/2001 | Nakayama | |
| 2004/0042642 | A1 | | 3/2004 | Bolle et al. | |
| 2004/0086193 | A1 | * | 5/2004 | Kameyama et al. | 382/254 |
| 2006/0017837 | A1 | * | 1/2006 | Sorek et al. | 348/362 |
| 2006/0104540 | A1 | * | 5/2006 | Haussecker et al. | 382/276 |

FOREIGN PATENT DOCUMENTS

EP        1 014-305 B1    9/2004

OTHER PUBLICATIONS

Park, Sung Cheol, Min Kuy Park and Moon Gi Kang, "Super-Resolution Image Reconstruction: A Technical Overview", IEEE Signal Processing Magazine, May 2003, 1053-5888/03.

Zhang, Zhong and Rick S. Blum, "A Hybrid Image Registration Technique for a Digital Camera Image Fusion Application", Oct. 6, 2000, Electrical Engineering and Computer Science Department, Lehigh University, Bethlehem, PA.

Schultz, Richard R., Li Meng and Robert L. Stevenson, "Subpixel Motion Estimation for Multiframe Resolution Enhancement", SPIE vol. 3024, 0277-786X/97.

Takeda, H., S. Farsiu, and P. Milanfar, "Regularized Kernel Regression for Image Deblurring" Proceedings of the 40th Asilomar Conference on Signals, Systems and Computers (Nov. 2006).

\* cited by examiner

*Primary Examiner* — Jefferey Harold
*Assistant Examiner* — Michael Teitelbaum
(74) *Attorney, Agent, or Firm* — Dov Rosenfeld; Inventek

(57) ABSTRACT

In particular embodiments, a process relating to the creation of a high-resolution video from a low-resolution video. In a particular embodiment, the process receives as input a sequence of low-resolution video frames. The process first determines a matching score for consecutive frames in the sequence, where the matching score is based on a preliminary global transformation between consecutive frames. From the matching scores, the process determines a set of matching windows and relative-motion estimates and then uses the set and estimates to calculate more thorough global transformations and any residual relative-motion which can be explained using independent object motion and/or optical flow. The process uses the latter global transformation and any independent object motion and/or optical flow to create motion trajectories and to generate high-resolution frames by interpolating low-resolution frames at trajectory-defined points, using regular-to-irregular spatio-temporal interpolation. The process then restores the frames, using deblurring, and outputs them.

17 Claims, 10 Drawing Sheets

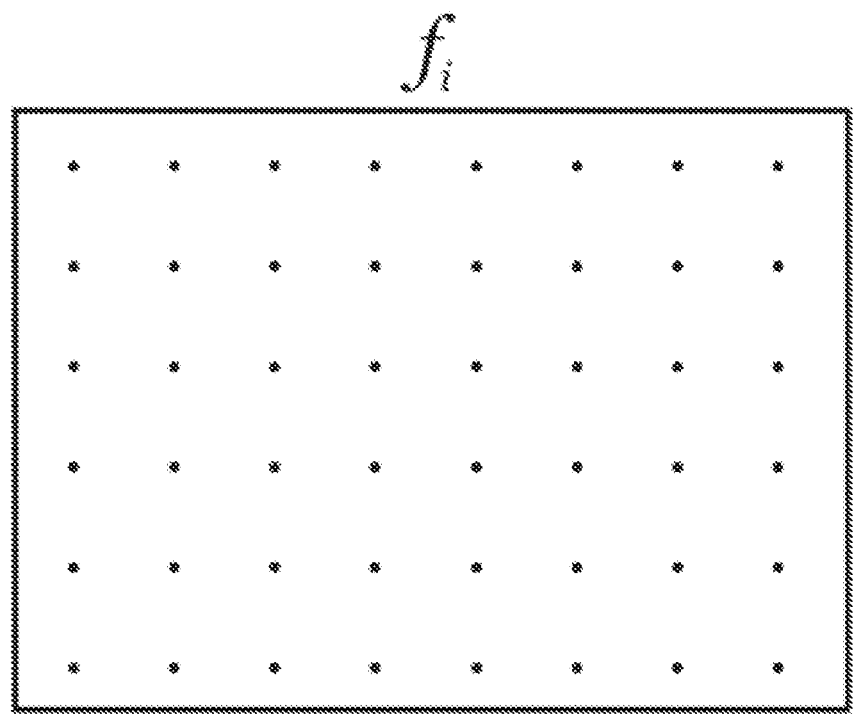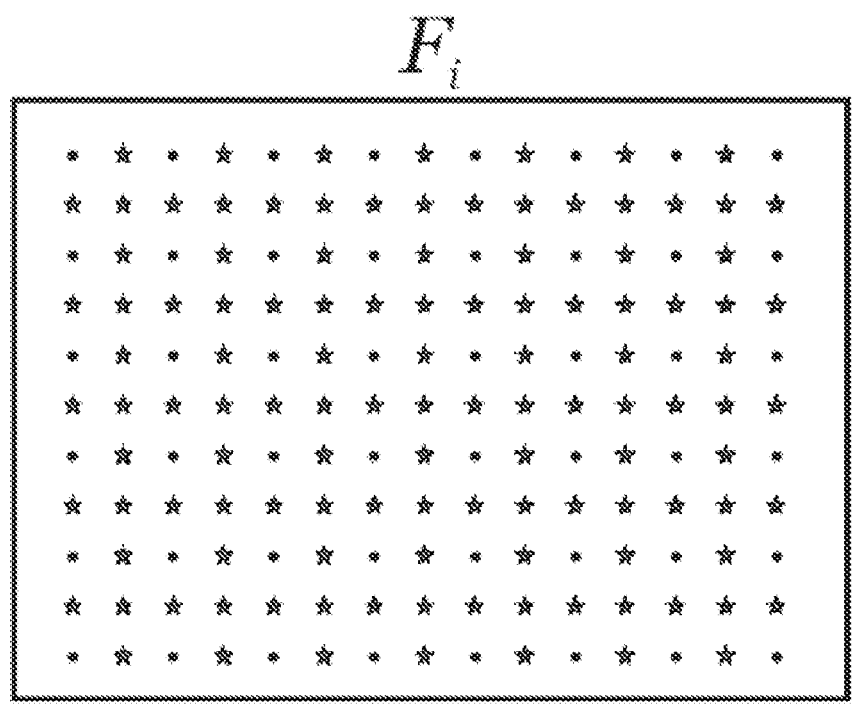
Fig. 1

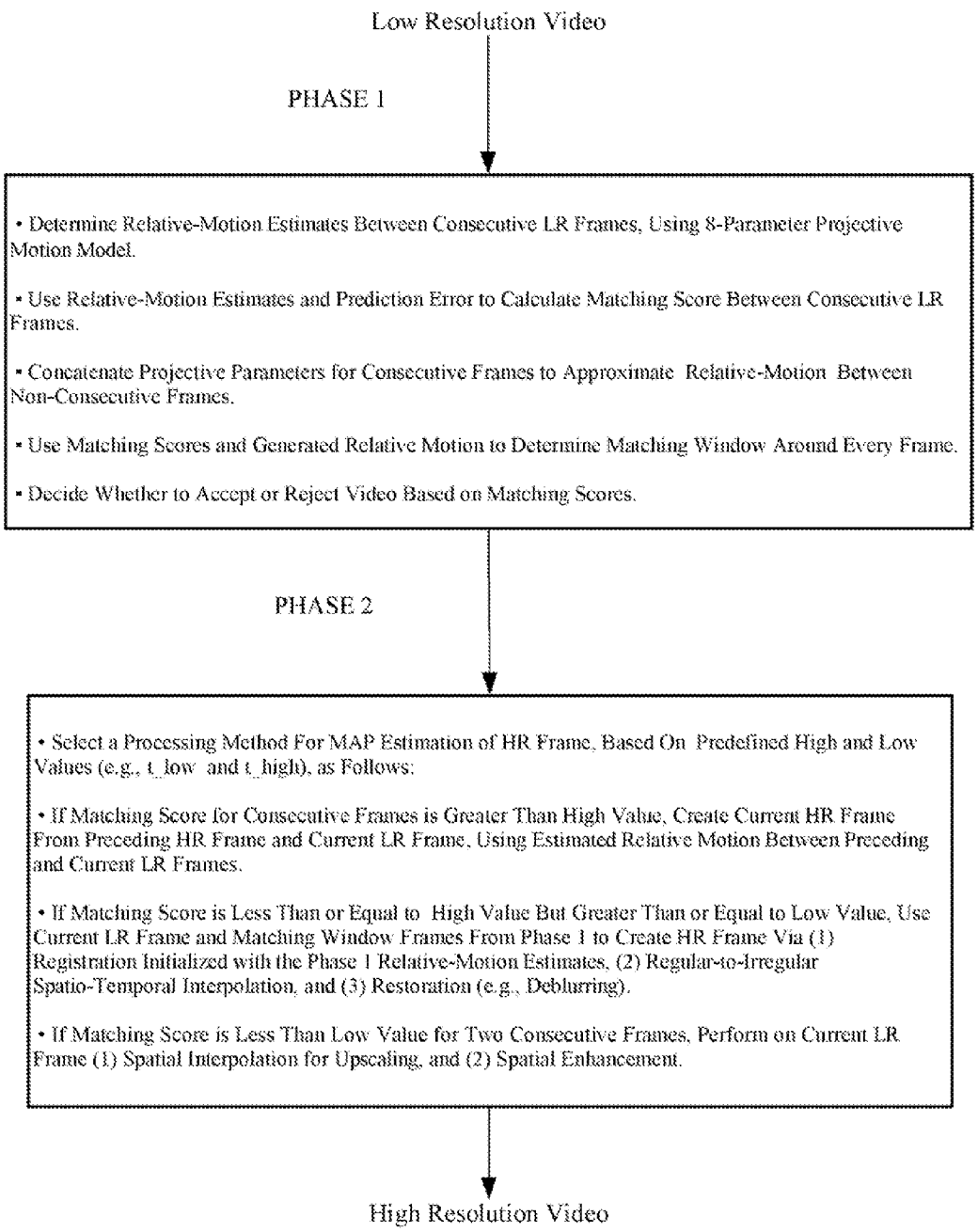

Low Resolution Video

PHASE 1

- Determine Relative-Motion Estimates Between Consecutive LR Frames, Using 8-Parameter Projective Motion Model.

- Use Relative-Motion Estimates and Prediction Error to Calculate Matching Score Between Consecutive LR Frames.

- Concatenate Projective Parameters for Consecutive Frames to Approximate Relative-Motion Between Non-Consecutive Frames.

- Use Matching Scores and Generated Relative Motion to Determine Matching Window Around Every Frame.

- Decide Whether to Accept or Reject Video Based on Matching Scores.

PHASE 2

- Select a Processing Method For MAP Estimation of HR Frame, Based On Predefined High and Low Values (e.g., t_low and t_high), as Follows:

- If Matching Score for Consecutive Frames is Greater Than High Value, Create Current HR Frame From Preceding HR Frame and Current LR Frame, Using Estimated Relative Motion Between Preceding and Current LR Frames.

- If Matching Score is Less Than or Equal to High Value But Greater Than or Equal to Low Value, Use Current LR Frame and Matching Window Frames From Phase 1 to Create HR Frame Via (1) Registration Initialized with the Phase 1 Relative-Motion Estimates, (2) Regular-to-Irregular Spatio-Temporal Interpolation, and (3) Restoration (e.g., Deblurring).

- If Matching Score is Less Than Low Value for Two Consecutive Frames, Perform on Current LR Frame (1) Spatial Interpolation for Upscaling, and (2) Spatial Enhancement.

High Resolution Video

Fig. 3

ENHANCING THE RESOLUTION AND QUALITY OF SEQUENTIAL DIGITAL IMAGES

TECHNICAL FIELD

The present disclosure relates to the digital image processing of sequential images.

BACKGROUND

An algorithm for super-resolution enhances the spatial resolution (or detail) of the images created by an imaging system. Typically, such an algorithm works by fusing together several low-resolution (LR) images to reconstruct a single high-resolution (HR) or super-resolution (SR) image or sequence of images. Resolution enhancement factor is the basic parameter of the super-resolution algorithm, denoting the ratio of the number of pixels in the HR and the LR image. For example, pixel grids for LR and HR image with a resolution enhancement factor of 4 are illustrated in FIG. 1, where $f_i$ is the LR image, $F_i$ is the HR image, and the stars in $F_i$ represent the new pixels resulting from the enhancement and are located on the half-pixel grid of $f_i$.

The basic premise for enhancing spatial resolution in an SR algorithm is the availability of multiple LR images covering the same scene. Two main assumptions used in any super-resolution process are: (1) LR images are generated from underlying continuous image with aliasing (i.e., they carry information about spatial frequencies higher than the Nyquist frequency of LR image); and (2) there is a relative shift between LR images. When the motion between the LR images is complex and not aligned with the full-pixel grid (which is true for virtually all captured videos) and when aliasing is present, each LR image carries some new information that can be used to generate an HR image. Suitable LR images can be obtained from a single camera (assuming there is a relative motion between the frames of video sequence) or from multiple cameras located in different positions. The relative motion between LR frames can occur as a result of the controlled motion in imaging systems, e.g., images acquired from orbiting satellites. This motion can also be the result of uncontrolled motion in the scene, e.g., movement of local objects or vibrating imaging systems. If the scene motion is known or can be estimated within subpixel accuracy, SR image reconstruction is possible.

In the non-uniform interpolation approach to super-resolution, SR image reconstruction usually consists of three steps: (a) registration or the estimation of relative motion (if the motion information is not known); (b) non-uniform interpolation of color intensities producing an improved resolution image, and (c) restoration, which often involves a deblurring process that depends on the observation model. These steps can be implemented separately or simultaneously according to the reconstruction methods adopted. In the registration step, the relative motion between LR images is estimated with fractional pixel accuracy. Accurate subpixel motion estimation is an important factor in the success of the SR image reconstruction algorithm. Since the motion between LR images is arbitrary, the registered data from LR images (i.e., warped onto the reference coordinate system of an HR frame) will not always match up to a uniformly spaced HR grid. Consequently, non-uniform interpolation of color intensities is used to obtain a uniformly spaced HR image from a non-uniformly spaced composite of LR images. Finally, image restoration is applied to the up-sampled image to remove blurring and noise. With regard to all of the foregoing, see Sung Cheol Park, Min Kyu Park, and Moon Gi Kang, Super-Resolution Image Reconstruction: A Technical Overview, IEEE Signal Processing Magazine (May, 2003), pp. 21-36.

As just noted, the first step in a typical super-resolution algorithm is registration. Image registration is the process of estimating a mapping between two or more images of the same scene taken at different times, from different viewpoints, and/or by different sensors. It geometrically aligns two images . . . the reference image and the so-called "matching" image.

Generally, there are two categories of image differences that need to be registered. Differences in the first category are due to changes in camera position and pose. These sorts of changes cause the images to be spatially misaligned, i.e., the images have relative translation, rotation, scale, and other geometric transformations in relation to each other. This category of difference is sometimes referred to as global transformation or global camera motion (GCM).

The second category of differences cannot be modeled by a parametric spatial transform alone. This category of differences can be attributed to factors such as object movements, scene changes, lighting changes, using different types of sensors, or using similar sensors but with different sensor parameters. This second category of differences is sometimes referred to as independent object motion or local object motion (LOM). Such differences might not be fully removed by registration due to the fact that LOM rarely conforms to the exact parametric geometrical transform. In addition, the innovation that occurs in video frames in the form of occlusion and newly exposed area can not be described using any predictive model. In general, the more LOM- or innovation-type differences exist, the more difficult it is to achieve accurate registration. See Zhong Zhang and Rick S. Blum, A Hybrid Image Registration Technique for a Digital Camera Image Fusion Application, Information Fusion 2 (2001), pp. 135-149.

Parametric coordinate transformation algorithms for registration assume that objects remain stationary while the camera or the camera lens moves; this includes transformations such as pan, rotation, tilt, and zoom. If a video sequence contains a global transformation between frames, the estimated motion field can be highly accurate due to the large ratio of observed image pixels to unknown motion model parameters. A parametric model which is sometimes used to estimate the global transformation that occurs in the real world is the eight-parameter projective model, which can precisely describe camera motion in terms of translation, rotation, zoom, and tilt. To estimate independent object motion, Horn-Schunck optical flow estimation is often used though it often requires a large number of iterations for convergence. See Richard Schultz, Li Meng, and Robert L. Stevenson, Subpixel Motion Estimation for Multiframe Resolution Enhancement, Proceedings of the SPIE (International Society for Optical Engineering), Vol. 3024 (1997), pp. 1317-1328, as to the foregoing and the details of the eight-parameter projective model.

Once the relative motion has been estimated in the registration phase, one obtains an HR image on non-uniformly spaced sampling points by the process sometimes referred to as "shift-and-add". The analysis of an irregularly spaced data series is more complicated than that of regularly spaced data series. More importantly, practically all modern systems for image storage and display use a regular grid for image representation. Consequently, it is necessary to re-sample a given irregularly sampled data series onto a regular grid. This re-sampling typically requires some form of interpolation or, in the presence of noise, reconstruction (effectively assuming certain properties of an "underlying" continuous function) of color intensities. Overall, the goal of interpolation/estimation is to provide the highest possible image fidelity at the output resolution. See H. -M. Adorf, Interpolation of Irregularly Sampled Data Series-A Survey, in Astronomical Data Analysis Software and Systems IV, ASP Conference Series, Vol. 77., 1995. This non-uniform interpolation is sometimes referred to as irregular-to-regular interpolation and it is different from the regular-to-irregular interpolation described below. As noted earlier, non-uniform interpolation is usually the second step of a classical super-resolution algorithm.

A related problem to SR techniques is image restoration. The goal of image restoration is to recover the original image from a degraded (e.g., blurred, noisy) image. Image restoration and SR reconstruction are closely related theoretically and SR reconstruction can be considered a second-generation problem of image restoration. As noted earlier, image restoration is usually the third step of a non-uniform interpolation algorithm for super-resolution, though it might be performed as a standalone process to remove blocks and/or quantization artifacts, for example.

Super-resolution and image restoration are useful in many applications, including, for example, the enhancement of the LR video that is produced by digital cameras in mobile telephones. The enhanced videos might then be displayed on a computer or distributed on an Internet video site such as MySpace or YouTube.

SUMMARY

In particular embodiments, the present invention provides methods, apparatuses, and systems directed to the creation of a high-resolution digital image or video, of improved quality, from a low-resolution digital video, through the use of processes for registration, interpolation (e.g., via regular-to-irregular spatio-temporal interpolation), and restoration.

BRIEF DESCRIPTION OF THE DRAWINGS

FIG. 1 is a diagram illustrating an HR image grid resulting from the resolution enhancement of an LR image where the resolution enhancement factor is 4.

FIG. 3 is a diagram showing a flowchart of a two-phase process for creating a HR video from an LR video, which process might be used in some embodiments of the present invention.

DESCRIPTION OF EXAMPLE EMBODIMENT(S)

The following example embodiments are described and illustrated in conjunction with apparatuses, methods, and systems which are meant to be examples and illustrative, not limiting in scope.

A. System Architecture for Image-Processing Client or Server

Figure 2:
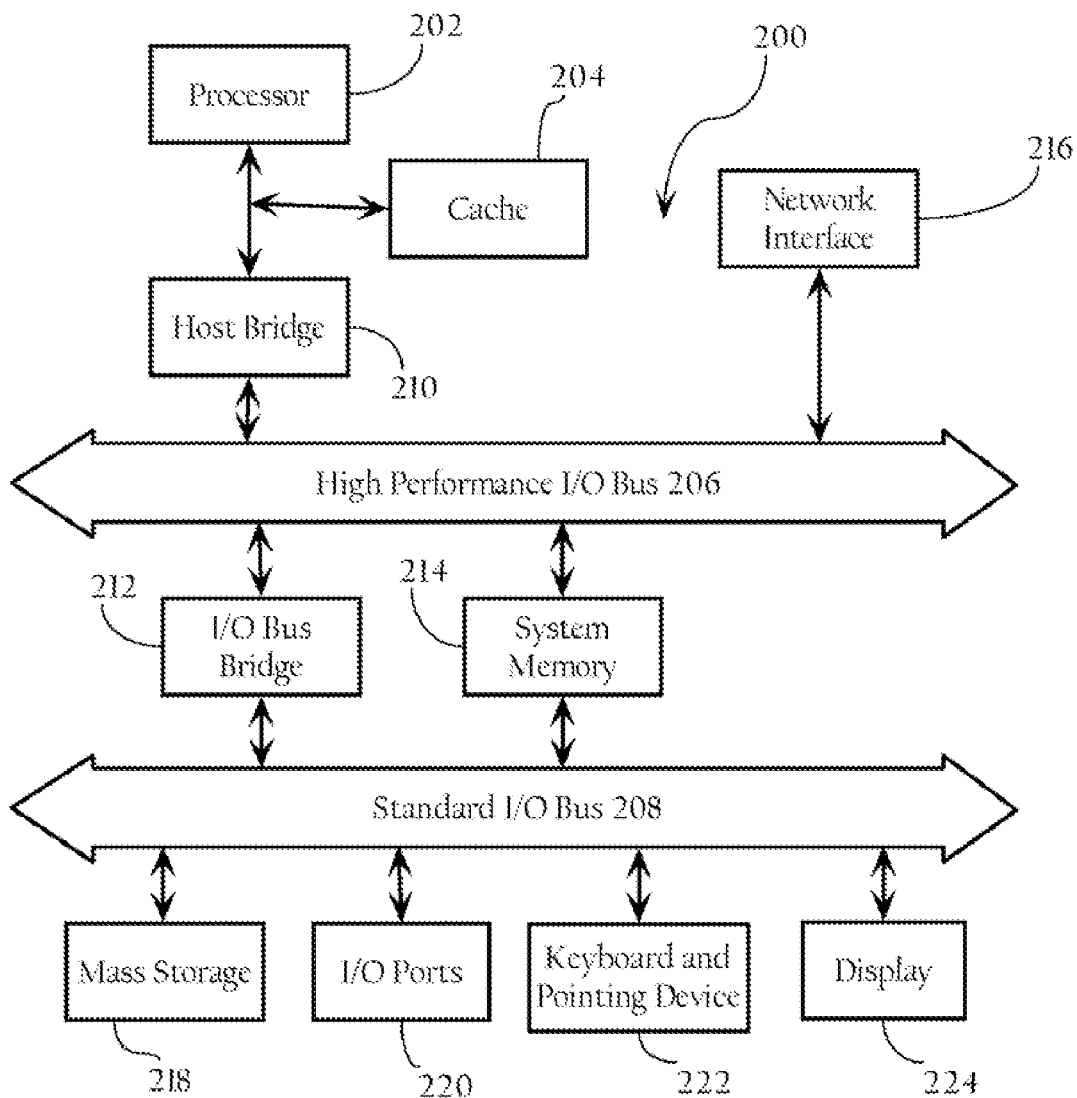
FIG. 2 is a block diagram showing system architecture for an image-processing client or server, which might be used in connection with the present invention in particular embodiments.

FIG. 2 illustrates, for didactic purposes, a hardware system 200, which might be a part of an image-processing client, server or appliance that runs the super-resolution processes described below, in particular embodiments. For example, the processes described herein may be embodied in a server or client-side application or module, or as a browser plug-in operative to enhance downloaded videos. In one implementation, a client-side application or browser plug-in may operate to enhance the displayed resolution of video downloaded from a remote resource. In some implementations, execution of the process steps described herein may be distributed between a server and a client system. For example, a server side module may perform certain pre-processing steps, while a client module may perform one or more remaining steps. The processes described herein may also be implemented on a video or graphics processing card, or any other suitable processing platform. In one embodiment, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. Hardware system 200 may further include video memory (not shown) and a display device coupled to the video memory. Mass storage 218 and I/O ports 220 couple to bus 208. In some, but not all, embodiments, hardware system 200 may also include a keyboard and pointing device 222 and a display 224 coupled to bus 208. Collectively, these elements are intended to represent a broad category of computer hardware systems, including but not limited to general purpose computer systems based on the x86-compatible processors manufactured by Intel Corporation of Santa Clara. Calif., and the x86-compatible processors manufactured by Advanced Micro Devices (AMD), Inc., of Sunnyvale, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the RF coverage map generator, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain embodiments of the present invention may not require nor include all of the above components. For example, the peripheral devices shown coupled to standard I/O bus 208 may couple to high performance I/O bus 206. In addition, in some embodiments only a single bus may exist with the components of hardware system 200 being coupled to the single bus. Furthermore, hardware system 200 may include additional components, such as additional processors, storage devices, or memories.

In particular embodiments, the processes described herein are implemented as a series of software routines run by hardware system 200. These software routines comprise a plurality or series of instructions to be executed by a processor in a hardware system, such as processor 202. Initially, the series of instructions are stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Linux operating system. However, the present invention may be used with other suitable operating systems, such as the Windows® 95/98/NT/XP operating system, available from Microsoft Corporation of Redmond, Wash., the Apple Macintosh Operating System, available from Apple Computer Inc. of Cupertino, Calif., UNIX operating systems, and the like.

B. High-Level Process in Two Phases

FIG. 3 is a diagram showing a two-phase, high-level process for creating a HR video from an LR video, which high-level process might run on an image-processing module in some embodiments of the present invention. The input to the high-level process, in one embodiment, is a LR video, which need not be an encoded bitstream such as MPEG-4. If the video happens to be an encoded bitstream, the process uses information provided in the encoding to enhance performance, e.g., through the adjustment of initial values with respect to parameters of the algorithm, like number of matching frames, deblurring strength, etc.

In Phase 1 of the high-level process shown in FIG. 3, the process determines relative-motion estimates between consecutive LR frames, through the use of the eight-parameter projective motion model described above. The process then uses these relative-motion estimate and motion-compensated prediction error to calculate a "matching score" between consecutive LR frames. The matching score is a function of the prediction error. In addition, the process concatenates the projective parameters for consecutive frames to approximate relative-motion between non-consecutive frames. The estimates for consecutive and non-consecutive frames are used by the process to initialize motion estimation in Phase 2.

Figure 4:
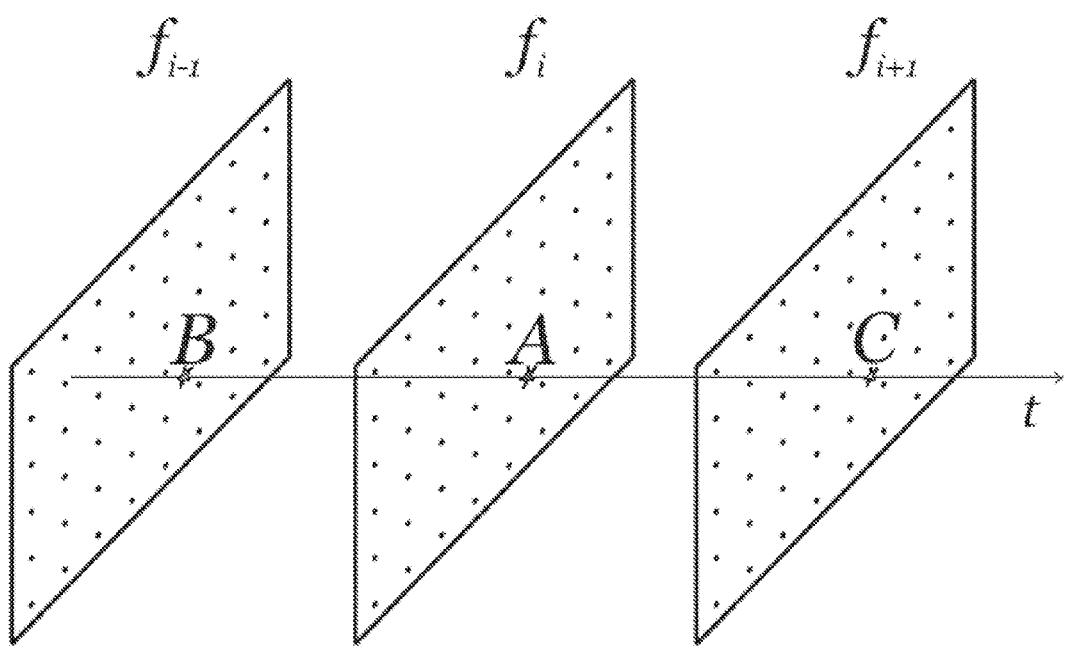
FIG. 4 is a diagram illustrating a matching window from phase 1 of a two-phase process for creating an LR video, which process might be used in some embodiments of the present invention.

The matching scores and the generated relative-motion are used by the process to determine a "matching window" around every frame (i.e., the number and the position of matching frames) that should be used for its enhancement. For example, a matching window of size 3 is illustrated in FIG. 4; frames $f_{i-1}$ and $f_{i+1}$ are used to enhance frame $f_i$ and t represents temporal axis. The size of this window is set to be less or equal than a pre-determined maximum number. In addition, the process may use the matching score to determine whether to accept or reject an LR video. For example, if there are too many independent scenes in the processed video as identified by matching scores, the process might reject the video.

As just described, one of the outputs of Phase 1 is a subset of frames from the original LR sequence, which subset might simplify processing in Phase 2. However, in other embodiments, the full LR sequence might be used. That is to say, the second phase of the high-level process does not depend upon the first phase, though addition of the first phase might well lead to faster convergence in the second phase.

In Phase 2 of the process shown in FIG. 3, the process selects from three processing methods for frames based upon a predefined high and a predefined low threshold value (e.g., t_high and t_low) to create a maximum a posteriori (MAP) estimate of an HR frame. First, if the matching score between consecutive frames is greater than the predefined high value (i.e., there is a high correlation between $LR_i$ and $LR_{i+1}$), the process creates an HR frame (e.g., $HR_{i+1}$) from the preceding HR frame ($HR_i$) and current LR frame (e.g., $LR_{i+1}$), using the estimated relative motion between frames $LR_i$ and $LR_{i+1}$. Second, if the matching score is less than or equal to the predefined high value but greater than or equal to the predefined low value, the process uses the current LR frame and frames from the matching window determined in Phase 1 as inputs to a method that has three functional components: (1) registration initialized with the Phase 1 relative-motion estimates; (2) regular-to-irregular spatio-temporal interpolation; and (3) restoration (e.g., deblurring). Third, if the matching score is less than the predefined low value for two consecutive frames, the process performs on the current LR frame: (1) spatial interpolation for upscaling; and (2) spatial enhancement (e.g., quantization-adaptive deblocking, deblurring, and histogram equalization). No information from neighboring frames is used for reconstruction.

As the quality of the reconstruction may depend on motion fidelity, one or more additional iterations of the motion estimation process might be performed in Phase 2, using motion estimates from Phase 1 for initialization.

Figure 5:
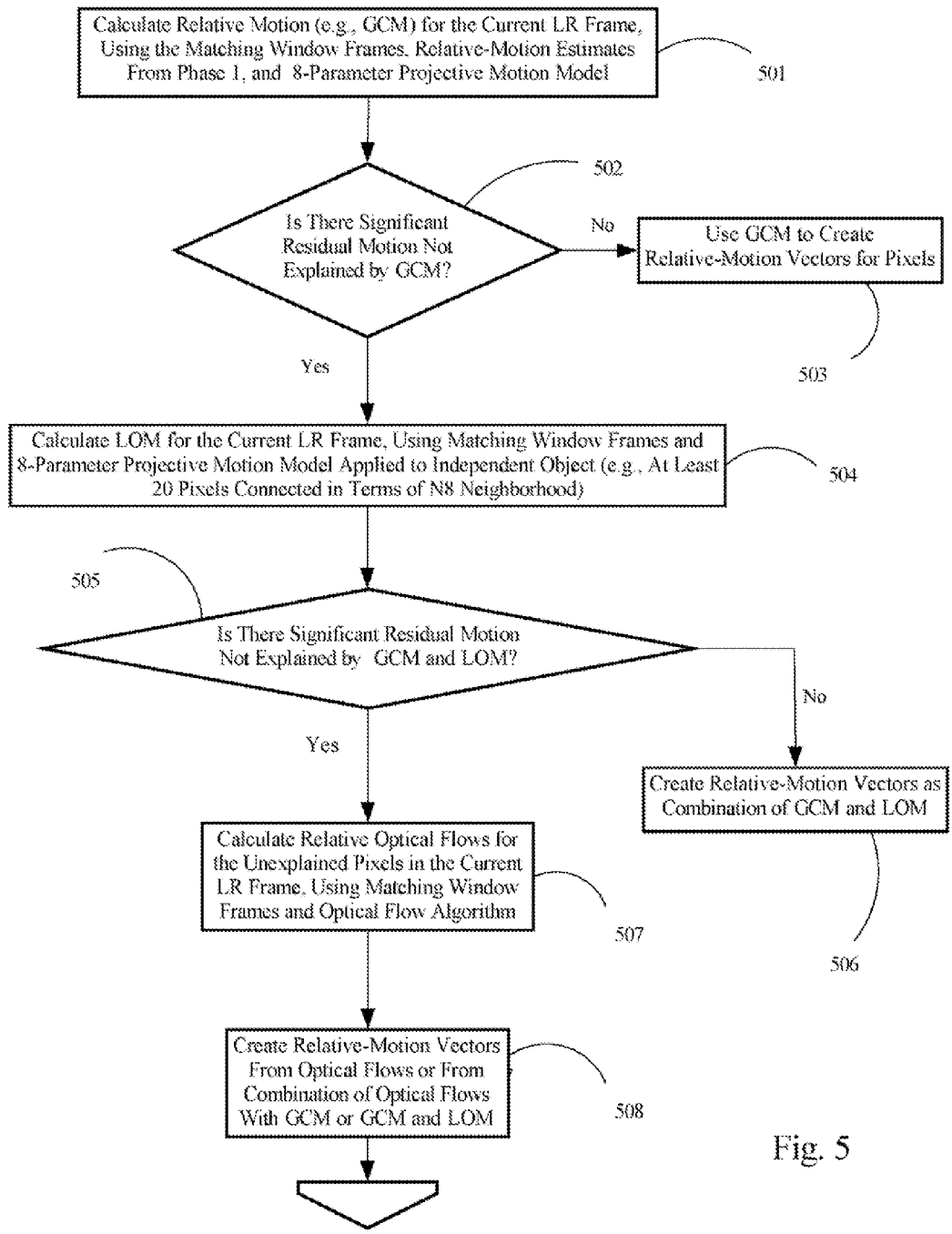
FIG. 5 is a diagram showing a flowchart of a process for the registration component of a method for the creation of an HR image, which method might be used in some embodiments of the present invention.

C. Processes for Registration, Regular-to-Irregular Spatio-Temporal Interpolation, and Restoration As just pointed out, the second phase of the high-level process uses a three-component method (registration, regular-to-irregular spatio-temporal interpolation, and restoration) when the matching score for consecutive frames is between a predefined high value and a predefined low value (e.g., when t_low≦matching score≦t_high). The first component in this method is registration initialized with the Phase 1 relative-motion estimates. FIG. 5 is a diagram showing a flowchart of a process for this component, which process might be used in particular embodiments.

In the process's first step 501, the process calculates relative motion (e.g., GCM) with respect to the current LR frame, using (a) the frames from the matching window and relative-motion estimates resulting from Phase 1 for initialization, and (b) the eight-parameter projective motion model described above. Then in step 502, the process determines whether there remains significant residual motion that is not explained by GCM. If not, the process goes to step 503 and uses GCM to create relative-motion vectors for the current LR frame's pixels. However, if significant unexplained residual motion remains, the process goes to step 504 and calculates relative LOM for the current LR frame, using (a) the frames from the matching window resulting from Phase 1, and (b) the 8 parameter projective motion model applied to independent objects. Then in step 505, the process determines whether there remains significant residual motion not explained by GCM and LOM. If not, the process goes to step 506 and creates motion vectors for pixels as a combination of GCM and LOM. However, if significant unexplained residual motion still remains, the process goes to step 507 and calculates relative optical flow for the unexplained pixels in the current LR frame, using (a) frames from the matching window resulting from Phase 1, and (b) an algorithm such as the Horn-Schunck algorithm. The process then goes to step 508 and generates motion vectors from (a) the optical flow, or (b) the optical flow in combination with GCM or, if there is any LOM, GCM and LOM.

In step 501 above, the process calculates GCM for the current LR frame with respect to the matching frames. Here, the GCM between non-consecutive frames is not simply the result of concatenation of GCM parameters between consecutive frames, as was true of the initial GCM that was calculated in Phase 1. Instead, motion is estimated with respect to every matching frame, with concatenated GCM parameters used for initialization. Similarly, concatenation is used to initialize the Horn-Schunck optical flow algorithm that emerge from step 507, which, as noted earlier, might require a large number of iterations to converge.

In step 504 above, the process calculates LOM for the current LR frame with respect to the matching frames. The process uses the same eight-parameter projective motion model that is used for calculating the GCM, in both Phase 1 and Phase 2, as applied to independent objects. In some embodiments, an independent object is defined as having at least 20 pixels connected in terms of their N8 neighborhood. It will be appreciated that both 20 and N8 are somewhat arbitrary values that might be adjusted as a result of empirical observation. When solving for the eight parameters in this model in both steps 501 and 504, the process might use a modified version of the Levenburg-Marquardt minimization algorithm, in particular embodiments. Further, particular embodiments of the process might use overlapping block-matching (OBM) instead of optical flow in step 507.

Figure 6:
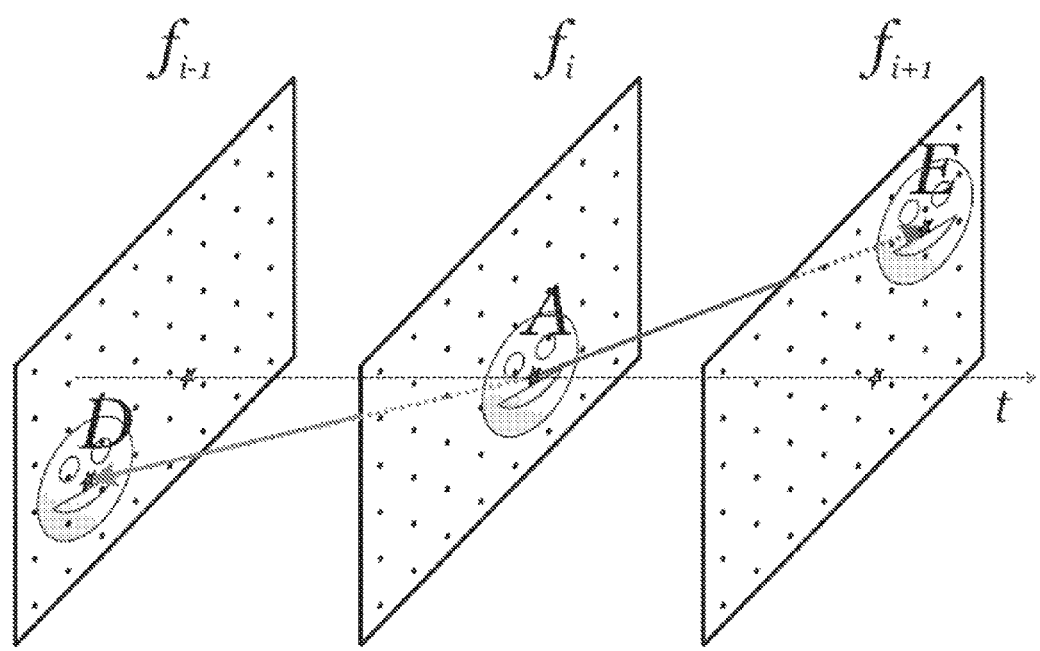
FIG. 6 is a diagram illustrating the motion vectors that establish the correspondence between the same physical object in multiple frames during the registration which might take place in some embodiments of the present invention.

In particular embodiments, motion vectors are generated for all positions on a HR grid (similar to that shown in FIG. 1) and anchored in the current frame. Motion vectors can point to arbitrary (real-valued) positions in matching frames, as illustrated in FIG. 6, where $f_i$ is the current frame and $f_{i-1}$ and $f_{i+1}$ are its preceding and succeeding matching frames, respectively. For example, points D and E (the arrowheads of the motion vectors anchored at point A) are not limited to any grid, as they depend solely on the motion in the video. Motion trajectories derived from the motion vectors establish correspondences between the same physical object observed in multiple frames. In particular embodiments, the factors that determine the length of motion trajectories are scene motion, innovation events (e.g., occluded and newly exposed areas), and temporal discontinuities (e.g., scene cuts).

Figure 7:
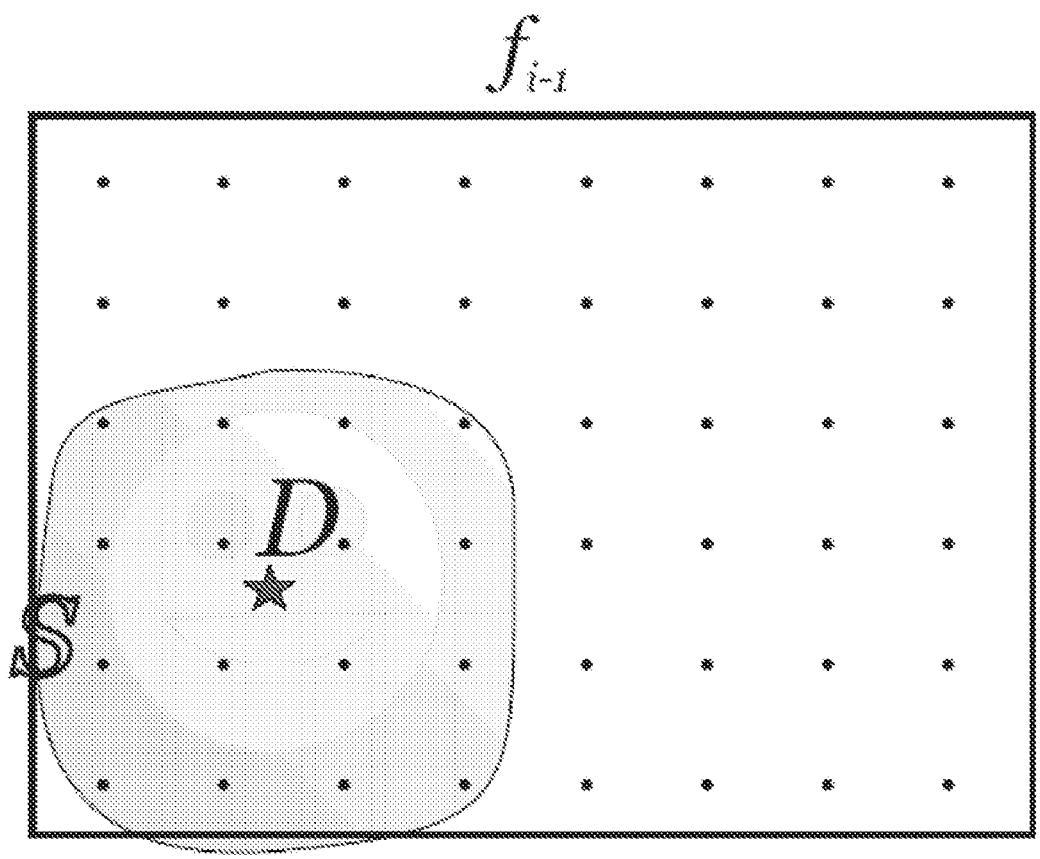
FIG. 7 is a diagram illustrating the uniform or regular-to-irregular interpolation which might take place in some embodiments of the present invention.

Also, in particular embodiments, matching positions are defined as intersections of a motion trajectory with the matching frames. It will be appreciated that the super-resolution process depends on color intensities at irregularly spaced matching positions. Consequently, the matching positions become the input for the regular-to-irregular spatial interpolation in each of the matching frames. An example of one such regular-to-irregular interpolation in frame $f_{i-1}$ is shown in FIG. 7. For frame $f_{i-1}$ in FIG. 7, the color intensity value at out-of-grid point D is obtained using spatial interpolation of the color intensities at pixels from the "local neighborhood". In particular embodiments, a bicubic interpolation method might be used, in which case "local neighborhood" corresponds to the shaded area S. As noted above, this interpolation is uniform or regular-to-irregular.

Figure 8:
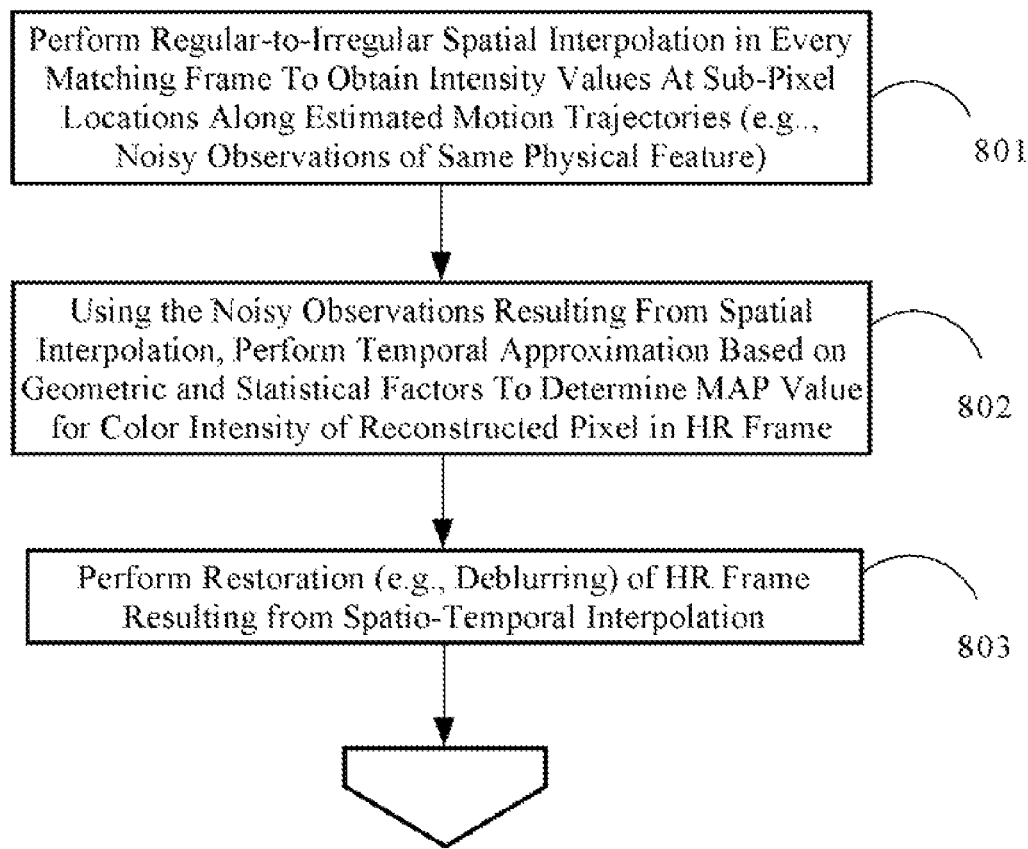
FIG. 8 is a diagram showing a flowchart of a process for the regular-to-irregular spatio-temporal interpolation and restoration components of a method for the creation of an HR image, which method might be used in some embodiments of the present invention.

Recall that Phase 2 of the high-level process described above uses a three-component method and that the second component in this method is regular-to-irregular spatio-temporal interpolation and the third component is restoration. FIG. 8 is a diagram showing a flowchart of a process for these second and third components, which might be used in particular embodiments.

Figure 9:
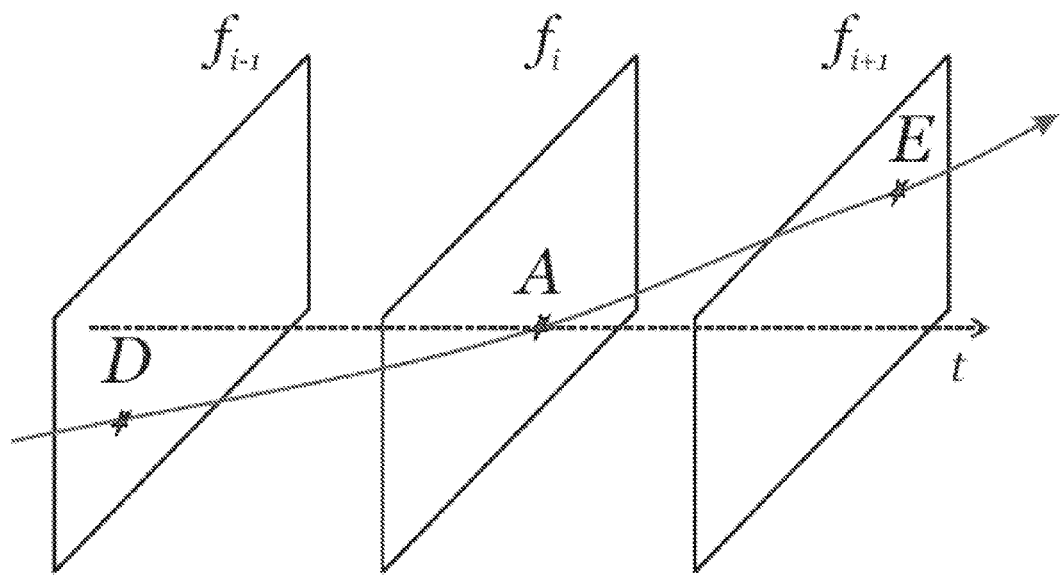
FIG. 9 is a diagram illustrating a motion trajectory which might result from motion vectors in some embodiments of the present invention.
Figure 10:
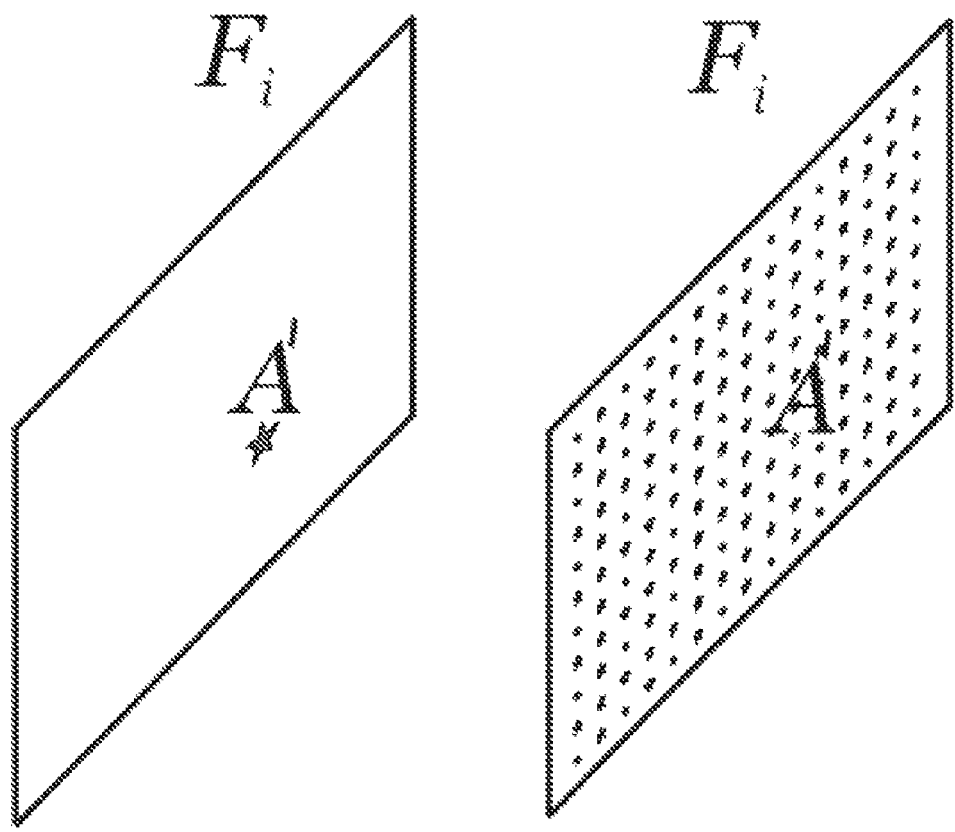
FIG. 10 is a diagram illustrating a reconstructed pixel in an HR frame, both by itself and with the other reconstructed pixels.

In the process's first step 801, the process performs regular-to-irregular spatial interpolation in every matching frame to obtain intensity values at sub-pixel locations along the motion trajectory estimated during registration. (FIG. 9 shows an illustration of such a motion trajectory, which might result from the motion vectors shown in FIG. 6.) The result of the spatial interpolation in step 801 is a number of noisy observations of the same physical feature, where the number of noisy observations is determined by the number of matching frames. Then in step 802 in FIG. 8, the process uses these noisy observations to perform temporal approximation based on geometric and statistical factors to determine the most likely (e.g., MAP) value for the color intensity of a reconstructed pixel. As steps 801 and 802 are repeated for every pixel in the new HR frame, the output of step 802 is an HR image. (FIG. 10 shows such a reconstructed pixel A, both by itself in an HR image and with the other reconstructed pixels that comprise the HR image.) In step 803 of FIG. 8, the HR image is restored (e.g., deblurred) and might become part of a HR video sequence.

As just noted, the process performs a regular-to-irregular spatial interpolation in step 801. This interpolation involves generating an unknown value for color intensity (e.g., RGB or YUV) at a subpixel location from color intensity values at neighboring regularly-spaced pixel locations. This approach using regular-to-irregular interpolation differs from the more computationally-intensive "shift-and-add" methods that rely on the irregular-to-regular (non-uniform) interpolation described earlier. It also allows for clear and separable modeling of spatial, temporal, and statistical factors involved with the reconstruction process.

In some embodiments, this regular-to-irregular spatial interpolation might be non-adaptive, e.g., bicubic or cubic spline interpolation. In other embodiments, this spatial interpolation might be edge-adaptive, e.g., steering kernel regression might be used. In still other embodiments, this spatial interpolation might be dynamically selected to be non-adaptive or edge-adaptive, depending upon the input data, e.g., the estimated motion trajectories.

Also as just noted, the process performs a temporal approximation based on both geometric and statistical factors in step 802. In some embodiments, the geometric factors might include (a) temporal distance, and (b) spatial distance. With respect to the first geometric factor, temporal distance, a formula such as the following might be used to assign a smaller weight to matching frames that are more distant in time from the current frame: $W_t=1-(\Delta t/N)^T$, where (i) $W_t$ is the weight, (ii) N is the width of the matching window, (iii) $\Delta t$ is the temporal distance between the current frame and the matching frame, and (iv) T is a user-defined parameter which has been empirically determined to be equal to 2, in some embodiments.

With respect to the second geometric factor, spatial distance, a weighting formula such as the following might be used in some embodiments: $W_d=1-param_{Wd}\sqrt{\Delta x^2+\Delta y^2}$, where (i) $W_d$ is the weight, (ii) $param_{Wd}$ is approximately 0.5 in all cases, (iii) $\Delta x$ and $\Delta y$ are x and y distances from nearest LR grid position of an evaluated point (such as point D in FIG. 7). The weight $W_d$ therefore decreases with the point's distance from a LR grid. In other embodiments, a larger value for $param_{Wd}$ such as $\sqrt{2}$ might be used. The choice of a proper value for $param_{Wd}$ depends upon the extent of aliasing in the LR frames that make up the input video. When there is more aliasing, one might use a larger $param_{Wd}$, depending upon empirical observations.

In particular embodiments, the following statistical factors might figure into weighting calculations for temporal approximation: (1) variance along the estimated motion trajectory and deviation of each spatially-interpolated intensity from the mean intensity along the motion trajectory; (2) quantization noise (e.g., the prediction error of a hybrid video coder is typically quantized; if the quantization parameter $Q_p$ is available from the encoded bitstream, it might be used to adjust temporal processing on a per-block basis); and (3) motion noise, i.e., inaccuracy in motion estimation, which has a highly non-linear effect on pixel-value noise. So, for example, the process might discard pixels from matching frames that do not fall within a predefined range from the pixel value obtained solely from LR frame, in sonic embodiments. Also, in some embodiments, a pixel from the current frame might receive greater weight than pixels from matching frames, unless the latter values are proximate to the value in the entreat frame In step 803, the process performs restoration of the HR frame that results from regular-to-irregular spatio-temporal interpolation. In some embodiments, this restoration might comprise deblurring. If the blurring function (i.e., the point spread function or psf) of the optical system that produced the LR video is known and is present in a system library, the process might use the blurring function for deblurring. In this case, the bilateral total variation (BTV) algorithm might be applied on either the luminosity channel or the three color channels independently. See H. Takeda, S. Farsiu, and P. Milanfar, Regularized Kernel Regression for Image Deblurring, Proceedings of the 40th Asilomar Conference on Signals, Systems, and Computers (November 2006). If the blurring function of the optical system is not known or if faster processing is desired, the psf might be approximated with a radially symmetric Gaussian blurring kernel, in some embodiments.

Particular embodiments of the above-described processes might be comprised of instructions that are stored on storage media. The instructions might be retrieved and executed by a processing system. The instructions are operational when executed by the processing system to direct the processing system to operate in accord with the present invention. Some examples of instructions are software, program code, firmware, and microcode. Some examples of storage media are memory devices, tape, disks, integrated circuits, and servers. In other implementations, the processes described above may be expressed as data signals embodied in a carrier wave comprising computer-readable instructions, which upon transmission are executable by a processing system. The term "processing system" refers to a single processing device or a group of inter-operational processing devices. Some examples of processing devices are integrated circuits and logic circuitry. Those skilled in the art are familiar with instructions, storage media, and processing systems. Still further, implementations of the invention may comprise an enhanced resolution video, expressed as a data signal of computer readable instructions or codes embodied in a carrier wave, which data signals are operative to cause one or more processors to display the enhanced resolution video on a display device.

Those skilled in the art will appreciate variations of the above-described embodiments that fall within the scope of the invention. In this regard, it will be appreciated that there are many possible orderings of the steps in the processes described above and many possible allocations of those steps between an image-processing client and server. Also, it will be appreciated that there are many other deblurring algorithms which might be used during restoration, for example, algorithms employing Tikhonov regularization and blind deconvolution. As a result, the invention is not limited to the specific examples and illustrations discussed above, but only by the following claims and their equivalents.

What is claimed is:

1. A method, comprising:
    receiving as input a sequence of two or more low resolution video frames, wherein one of the low resolution video frames is a current frame;
    calculating a global transformation, relative to the current frame, for the sequence of video frames;
    determining whether unexplained relative motion remains following calculation of the global transformation;
    responsive to identifying the unexplained relative motion, calculating an independent object motion, relative to the current frame, for the sequence of video frames;
    determining whether unexplained relative motion remains following calculation of the global transformation and any independent object motion;
    responsive to identifying the unexplained relative motion, calculating an optical flow, relative to the current frame, for the sequence of video frames;
    creating pixel motion trajectories, relative to the current frame, for the sequence of video frames, based on the calculated global transformation, any calculated independent object motion and any calculated optical flow;
    interpolating an enhanced resolution frame for the current frame from the pixel motion trajectories using spatio-temporal interpolation; and
    outputting the enhance resolution frame.

2. The method of claim 1, further comprising the step of restoring the enhanced resolution frame.

3. The method of claim 1, wherein the spatio-temporal interpolation comprises regular-to-irregular spatial interpolation.

4. The method of claim 1, wherein a subset of the sequence of low resolution video frames are used for the calculation of global transformation, any calculated independent object motion, any calculated optical flow, and the creation of pixel motion trajectories.

5. The method of claim 1, wherein the calculation of the global transformation uses an eight-parameter projective motion model.

6. The method of claim 1, wherein the calculation of independent object motion uses an eight-parameter projective motion model.

7. The method of claim 2, wherein the restoration comprises deblurring.

8. The method claim 7, wherein the deblurring is based on a point spread function whose description is stored in a system library.

9. One or more non-transitory computer-readable media comprising computer-readable instructions for execution and when executed operable to cause one or more processors to:
receive as input a sequence of two or more low resolution video frames, wherein one of the low resolution video frames is a current frame;
calculate a global transformation, relative to the current frame, for the sequence of video frames;
determine whether unexplained relative motion remains following calculation of the global transformation;
responsive to identifying the unexplained relative motion, calculate an independent object motion, relative to the current frame, for the sequence of video frames;
determine whether unexplained relative motion remains following calculation of the global transformation and any independent object motion;
responsive to identifying the unexplained relative motion, calculate an optical flow, relative to the current frame, for the sequence of video frames;
create pixel motion trajectories, relative to the current frame, for the sequence of video frames, based on the calculated global transformation, any calculated independent object motion and any calculated optical flow;
interpolate an enhanced resolution frame for the current frame from the pixel motion trajectories, using spatio-temporal interpolation; and
output the enhanced resolution video frame.

10. The non-transitory computer-readable media of claim 9, further comprising executable logic to restore the high resolution frame.

11. The non-transitory computer-readable media of claim 9, wherein the spatio-temporal interpolation comprises regular-to-irregular spatial interpolation.

12. The non-transitory computer-readable media of claim 9, wherein a subset of the sequence of low resolution video frames are used for the calculation of global transformation, any calculated independent object motion, any calculated optical flow, and the creation of pixel motion trajectories.

13. The non-transitory computer-readable media of claim 9, wherein the calculation of the global transformation uses an eight-parameter projective motion model.

14. The non-transitory computer-readable media of claim 9, wherein the calculation of independent object motion uses an eight-parameter projective motion model.

15. The non-transitory computer-readable media of claim 10, wherein the restoration comprises deblurring.

16. The non-transitory computer-readable media claim 15, wherein the deblurring is based on a point spread function whose description is stored in a system library.

17. An apparatus, comprising:
a memory;
one or more processors; and
a non-transitory computer readable medium comprising computer readable instructions encoded thereon, the computer-readable instructions operative, when executed, to cause the one or more processors to:
display an enhanced resolution video, one or more frames of the enhanced resolution video output from an enhanced resolution module comprising:
one or more processors, and logic encoded in one or more computer-readable media for execution and when executed operable to:
receive as input a sequence of two or more low resolution video frames;
create pixel motion trajectories for the sequence of video frames by registering the frames;
perform regular-to-irregular spatial interpolation on the registered frames, wherein the results of this spatial interpolation are noisy observations;
perform temporal approximation on the noisy observations, wherein the results of this temporal approximation are high resolution video frames; and
output a sequence of enhanced resolution video frames.

* * * * *

UNITED STATES PATENT AND TRADEMARK OFFICE
CERTIFICATE OF CORRECTION

| | | |
|---|---|---|
| PATENT NO. | : 8,279,341 B1 | Page 1 of 1 |
| APPLICATION NO. | : 11/678998 | |
| DATED | : October 2, 2012 | |
| INVENTOR(S) | : Bozinovic | |

It is certified that error appears in the above-identified patent and that said Letters Patent is hereby corrected as shown below:

In Column 9, line 41, before "embodiments", kindly replace "sonic" with --some--.

In Column 9, line 45, before "frame", kindly replace "entreat" with --current--.

In Column 9, line 45, kindly replace "frame" with --frame.--.

Signed and Sealed this
Twelfth Day of February, 2013

Teresa Stanek Rea
*Acting Director of the United States Patent and Trademark Office*